3,220,808
ALLOYS
John Elvet Davies, London, England, assignor to Bristol Siddeley Engines Limited, Bristol, England, a company of Great Britain
No Drawing. Filed June 28, 1963, Ser. No. 291,283
Claims priority, application Great Britain, June 29, 1962, 25,090/62
9 Claims. (Cl. 29—194)

This invention relates to silver aluminum alloys and one object is to provide such an alloy for use as a brazing alloy for brazing titanium and titanium alloys.

According to the present invention, an alloy consists of from 85.1% to 99.5% of silver, the balance—excluding impurities—being substantially all aluminum.

According to another aspect of the invention, an alloy consists of from 85.1% to 99.5% of silver; and from 0.5% to 14.9% of aluminum, the balance—excluding impurities—being well known additives used for brazing alloys.

The usual additions are between 0.05% and 1% of lithium, between 0.05% and 2% of copper, between 0.05% and 2% of nickel, and between 0.05% and 2% of manganese.

The particular alloys defined above melt at about or above 700° C. and this makes them suitable for combining a titanium brazing operation with a solution treatment, or ageing treatment, or annealing operation, to be carried out simultaneously at a temperature above 700° C. For certain titanium alloys, certain specific heat treatments are desirable and these should be carried out at certain specific temperatures and therefore brazing alloys having melting points a little below these specific temperatures may be used. Particular alloys of this nature have respectively 86%, 97.5%, 94%, 85.1% and between 95.5% and 97.7% silver. The alloys, the subject of this invention, are not exclusively for brazing titanium and may be used for brazing other materials and for other purposes, but the invention may be considered also to include a method of brazing titanium or a titanium alloy using as a brazing alloy, one of the alloys defined above. In particular the brazing operation may be carried out simultaneously with a particular heat treatment of the titanium or titanium alloy.

Certain specific examples of brazing alloys useful for brazing particular titanium alloys requiring particular heat treatments are exemplified below.

*Example 1*

I.M.I. Titanium 205 (EX011) is a titanium alloy which is unique in that it is capable of being cold rolled and a preferred heat treatment for this alloy is performed at 725° C. For brazing this titanium alloy, a silver aluminum alloy having 14% of aluminum is preferred because this alloy melts at 715° C. and flows readily in an argon atmosphere at 720° C.

*Example 2*

Hylite 50 and I.M.I. Titanium 679 are creep-resistant, high-tensile, titanium alloys and are in consequence used in compressors at temperatures in the range 300 to 450° C. The heat treatment of these alloys is preferably performed at 900° C. and accordingly these can be brazed using a silver aluminum alloy with 2.5% aluminum because this alloy has a melting point of 890° C.

*Example 3*

I.M.I. Titanium 314A and Hylite 40 are standard titanium forging alloys used on aircraft components and in gas turbine compressors. A preferred heat treatment for these alloys is performed at 800° C. and accordingly a 6% aluminum alloy is used as the brazing alloy because this has a melting point of 790° C. An alternative is to perform the heat treatment at 800° C., cool to 700° C. and perform the brazing with a 14.9% aluminum alloy. I.M.I. Titanium 318A and Hylite 45 are alternative alloys to those mentioned in this example.

*Example 4*

I.M.I. Titanium 317 and Hylite 20 are strong, weldable, sheet and forging, titanium alloys having high-tensile properties, and these are preferably heat treated at between 850 and 910° C. A silver aluminum alloy containing from 4.5% to 2.3% of aluminum may be used as a brazing alloy for these titanium alloys.

*Example 5*

I.M.I. Titanium 230 is a titanium alloy in sheet form, or forging alloy, which is capable of being welded and this is preferably heat treated at 800° C. Accordingly it can be brazed at the same time using a silver aluminum alloy consisting of 6% aluminum.

If a vacuum furnace is available, the brazing operation will preferably be carried out in vacuum or possibly in the presence of an inert gas. However, if no vacuum furnace is available, a suitable flux may be used.

The invention is expected to have particular application in aircraft engines and more particularly for bonding titanium or titanium alloy compressor blades to their supporting rings which may also be made of titanium or titanium alloy. This is because in view of troubles experienced with corrosion of steel parts particularly in naval applications with the more rapid rates of corrosion due to sea air, there is a real requirement for a corrosion resistant metal having the strength of steel, and titanium and certain titanium alloys fulfil this requirement.

The following table gives the compositions of the various alloys referred to above.

| Alloy | Al | Cu | Mn | Mo | Si | Sn | V | Zr | Remarks |
|---|---|---|---|---|---|---|---|---|---|
| I.M.I. 205 (EX011) | | | | 15 | | | | | Cold Rolled High Strength. |
| I.M.I. 314A, Hylite 40 | 4 | | 4 | | | | | | Forgings, useable up to 350° C. |
| I.M.I. 318A, Hylite 45 | 6 | | | | | | 4 | | Forging and Sheet useable up to 350° C. |
| I.M.I. 317, Hylite 20 | 5 | | | | | 2½ | | | Weldable Forging and Sheet useable up to 400° C. |
| I.M.I. 230 | | 2 | | | | | | | Forging and Sheet stronger than Commercially Pure Weldable. |
| Hylite 50 | 4 | | | 4 | ½ | 2 | | | Forging, useable up to 400° C. |
| I.M.I. 679 | 2¼ | | | 1 | .4 | 11 | | 5 | Forging, useable up to 450° C. |

I.M.I. alloys are supplied by Imperial Metals Industries, Limited. Hylite alloys are supplied by William Jessop Limited. Figures given are percentages by weight approximately. The balance is substantially all titanium.

What I claim as my invention and desire to secure by Letters Patent is:

1. A method of brazing components of a material comprising 85% titanium and 15% molybdenum in which a brazing alloy consisting of 86% silver and 14% aluminum is raised to a temperature of 725° C. to braze the components.

2. A method of brazing components of a material comprising 89.5% titanium, 4% aluminum, 4% molybdenum, 2% tin, and 0.5% silicon, in which a brazing alloy consisting of 97.5% silver, and 2.5% aluminum is raised to a temperature of 900° C. to braze the components.

3. A method of brazing components of a material comprising 80.35% titanium, 2.25% aluminum, 1% molybdenum, 0.4% silicon, 11% tin, and 5% zirconium, in which a brazing alloy consisting of 97.5% silver, and 2.5% aluminum is raised to a temperature of 900° C. to braze the components.

4. A method of brazing components of a material comprising 92% titanium, 4% aluminum and 4% manganese, in which a brazing alloy consisting of 94% silver and 6% aluminum is raised to a temperature of 800° C. to braze the components.

5. A method of brazing components of a material comprising 90% titanium, 6% aluminum, and 4% vanadium, in which a brazing alloy consisting of 94% silver and 6% aluminum is raised to a temperature of 800° C. to braze the components.

6. A method of brazing components of a material comprising 92.5% titanium, 5% aluminum, and 2.5% tin in which a brazing alloy consisting of 97.7% to 95.5% silver and from 4.5% to 2.3% of aluminum is raised to a temperature between 850° C. and 950° C. to braze the components.

7. A method of brazing components of a material comprising 98% titanium and 2% copper in which a brazing alloy consisting of 94% silver and 6% aluminum is raised to a temperature of 800° C. to braze the components.

8. A brazed joint in which components of a material in the group comprising titanium and a titanium alloy are united by an alloy consisting of from 85.1% to 99.5% silver and from 14.9% to 0.05% aluminum.

9. A brazed joint in which components of a material in the group comprising titanium and titanium alloy are united by an alloy consisting of 85.1% to 99.5% of silver and from 14.9% to 0.5% aluminum and at least one additive taken from the group comprising from 0.05% to 1% of lithium, from 0.05% to 2% of copper, from 0.05% to 2% of nickel, and from 0.05% to 2% of manganese.

References Cited by the Examiner
UNITED STATES PATENTS

| | | | |
|---|---|---|---|
| 475,382 | 5/1892 | Carroll | 75—173 |
| 1,863,612 | 6/1932 | Assmann | 75—173 |
| 1,863,645 | 6/1932 | Assmann | 75—173 |
| 2,376,577 | 5/1945 | Dean | 75—173 |
| 2,376,581 | 5/1945 | Dean | 75—173 |
| 2,793,115 | 5/1957 | Bredzs | 75—173 |
| 2,914,848 | 12/1959 | Blum | 75—173 |

OTHER REFERENCES

Metals Handbook, 1948 edition, pages 11, 46.

DAVID L. RECK, *Primary Examiner.*

HYLAND BIZOT, *Examiner.*